(12) United States Patent
Muetzel et al.

(10) Patent No.: US 10,115,284 B2
(45) Date of Patent: Oct. 30, 2018

(54) SYSTEM AND METHOD FOR EARLY WEATHER ALERT

(71) Applicant: ZF Friedrichshafen AG, Friedrichshafen (DE)

(72) Inventors: Ronald Muetzel, Hawthorn Woods, IL (US); Thomas Roesch, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 835 days.

(21) Appl. No.: 13/961,233

(22) Filed: Aug. 7, 2013

(65) Prior Publication Data

US 2015/0042479 A1    Feb. 12, 2015

(51) Int. Cl.
*G08B 21/10* (2006.01)
*G01W 1/10* (2006.01)
*B66C 23/88* (2006.01)

(52) U.S. Cl.
CPC .............. *G08B 21/10* (2013.01); *B66C 23/88* (2013.01); *G01W 1/10* (2013.01)

(58) Field of Classification Search
CPC ...... G08B 21/10; G08B 21/18; G08B 21/162; G08B 21/20; G01W 1/00; G01W 1/02; G01W 1/10; G01W 2001/006; G01V 1/00; B66C 23/88; B66C 23/90; B66C 2700/00
USPC ........................................................ 702/3–4
See application file for complete search history.

(56) References Cited

U.S. PATENT DOCUMENTS

2010/0085197 A1*  4/2010  Delia ...................... G01W 1/00
                                                                340/601
2012/0303278 A1    11/2012  Dannevik et al.

FOREIGN PATENT DOCUMENTS

EP            1 221 426 A2     7/2002
WO  PCT/US/2009/064099      * 11/2009

OTHER PUBLICATIONS

European Office Action dated Jan. 14, 2016 for European Patent Application No. 14 175 901.9 (English language) 5 pages.

* cited by examiner

*Primary Examiner* — Gregory J Toatley
*Assistant Examiner* — Lynda Dinh
(74) *Attorney, Agent, or Firm* — Brinks Gilson & Lione

(57) ABSTRACT

An early alert system may comprise a data processing unit and a plurality of monitoring units distributed in a defined area. Each of the plurality of monitoring units is configured to detect physical information associated with a fluid. The data processing unit is configured to receive physical information associated with a fluid from a plurality of monitoring units that are distributed in a defined area; calculate a flow field associated with the fluid within the defined area based on the physical information associated with the fluid that is received from the plurality of monitoring units; predict future physical information associated with the fluid at a target coordinate in the defined area based on the flow field; and send a message associated with the predicted future physical information to a receiver upon receipt of a trigger signal associated with the predicted future physical information.

19 Claims, 6 Drawing Sheets

SYSTEM AND METHOD FOR EARLY WEATHER ALERT

BACKGROUND OF THE INVENTION

1. Field of the Invention

The invention relates to systems and methods for calculating a flow field of a fluid and conducting a prediction to future behaviors of the flow field. In particular, the invention relates to calculating and predicting weather conditions in a particular area.

2. Related Art

A sudden change in weather conditions often has significant effects to the operation of equipment such as, but not limited to, wind turbines, cranes, and trucks. For example, cranes may be sensitive to wind speed, directions, and/or sudden changes in wind speed and wind direction. A crane that is operating in windy areas may bear significant forces due to the wind. When wind applies force from behind a crane, the load that the crane is lifting may swing forward, causing the load radius (i.e., the horizontal distance from the center pin of the crane to the center of gravity of the load being lifted) to increase significantly. Thus, where a crane have no issues lifting a relatively light-weight load in a gentle breeze, the same crane lifting the same load may overturn or otherwise sustain damage on a windy day.

Although most cranes are designed to withstand minimum in-service wind speeds (typically 31 mph for mobile cranes, 45 mph for tower cranes and 64 mph for dockside and container cranes), such cranes must lower their arms, booms, or jibs when the wind speed rises above the specified threshold. For those cranes that cannot be easily lowered to the ground, such as tower, dock and offshore cranes, operation of the crane must cease when the wind speed rises over the specified threshold wind speed (for example, 80 mph onshore and 98 mph offshore).

Current technologies allow measurements to be taken of weather conditions (e.g., wind speed) on the boom and/or at the site of the crane. Thus, a crane operator may be notified when weather conditions endanger or hamper crane operation, such as when the wind speed rises over the threshold speed for safe operation. However, the notification occurs only after the existence of the dangerous weather conditions, and an early warning of the dangerous weather conditions is needed.

SUMMARY OF THE INVENTION

The descriptions below include apparatuses and methods for conducting early alert to a flow field of a fluid.

According to one embodiment of the invention, a computer-implemented method performed by a data processing unit comprises receiving physical information associated with a fluid from a plurality of monitoring units that are distributed in a defined area; calculating a flow field associated with the fluid within the defined area based on the physical information associated with the fluid that is received from the plurality of monitoring units; predicting future physical information associated with the fluid at a target coordinate in the defined area based on the flow field; and sending a message associated with the predicted future physical information to a receiver upon occurrence of a trigger condition associated with the predicted future physical information.

According to another embodiment of the invention, an early alert apparatus, comprises a data processing unit configured to receive physical information associated with a fluid from a plurality of monitoring units that are distributed in a defined area; calculate a flow field associated with the fluid within the defined area based on the physical information associated with the fluid that is received from the plurality of monitoring units; predict future physical information associated with the fluid at a target coordinate in the defined area based on the flow field; and send a message associated with the predicted future physical information to a receiver upon receipt of a trigger signal associated with the predicted future physical information.

According to another embodiment of the invention, a computer-implemented method comprises receiving a message associated with predicted physical information; and generating a warning signal when the prediction is above a threshold value, wherein the prediction is based on a flow field associated with the fluid, and wherein the flow field is calculated based on physical information received from a plurality of monitoring units that are distributed in a defined area.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION

According to one embodiment of the invention, a system may be used to collect and process physical information of a flow field of a fluid, such as air or water, from multiple positions distributed in a defined area, and calculate a flow field of the fluid in the defined area. Then the system may predict a future behavior of the flow field that may be indicative of future weather conditions, at a target position in the area. The system may also send a warning signal or warning information to receivers at the target position. The receivers may be weather forecast units used to apprise persons working at the target position, and possibly using heavy equipment at the target position, who may be adversely affected by the future weather conditions.

Figure 1:
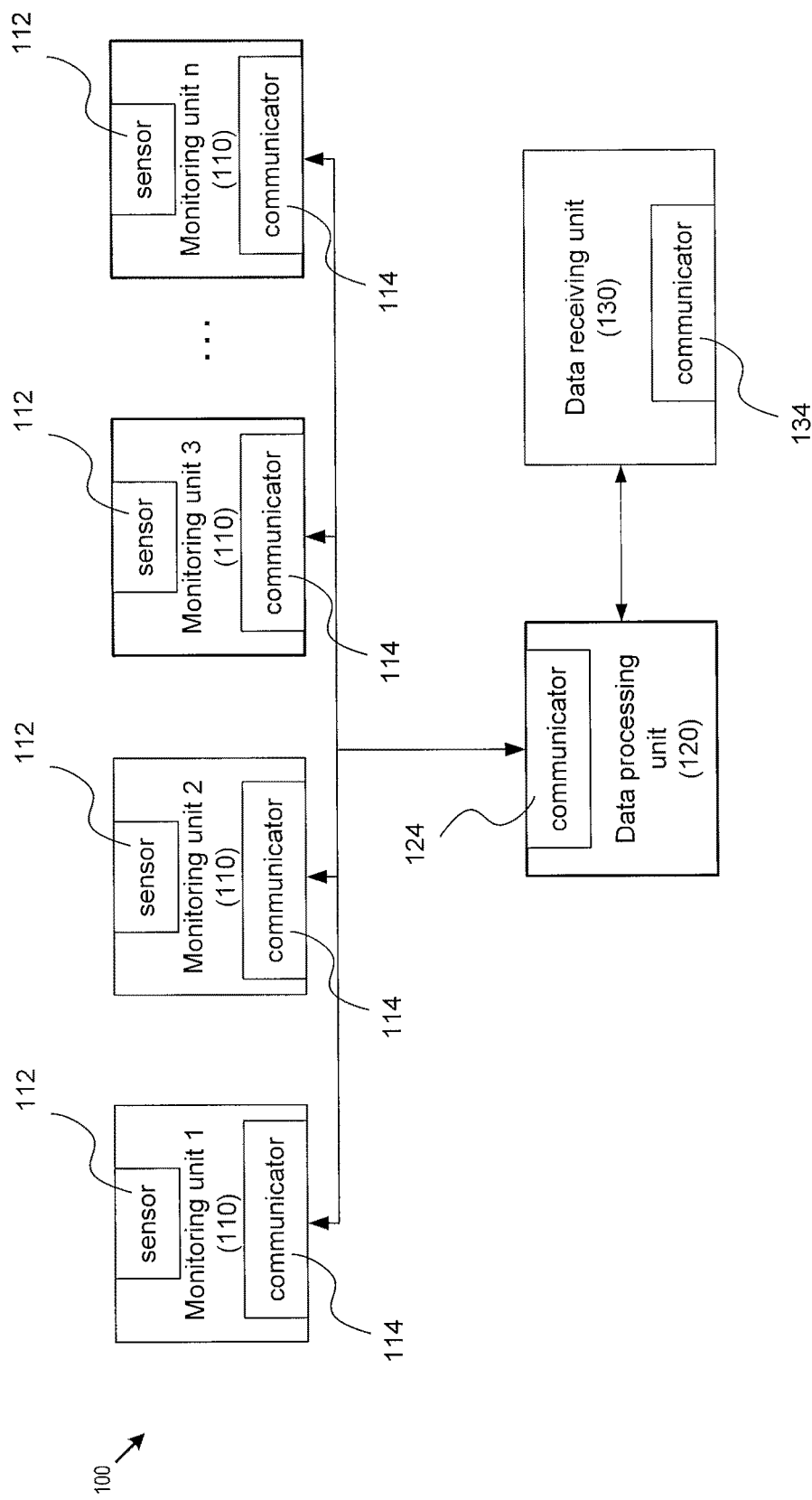
FIG. 1 illustrates a block diagram of a flow field monitoring system according to one embodiment of the invention.

FIG. 1 illustrates a block diagram of a flow field monitoring system according to one embodiment of the invention. The system includes a data processing unit 120, a data receiving unit 130, and multiple monitoring units 110 (monitoring unit 1, monitoring unit 2, monitoring unit 3 . . . and monitoring unit n).

Each of the multiple monitoring units 110 may include a communicator 114 capable of communicating with the data processing unit 120 and a sensor 112 capable of measuring and/or detecting certain physical information of a fluid. The fluid may be air, water, or other type of fluid, and the physical information of the fluid may be in-situ flow velocity (i.e., wind or water speed and direction), in-situ pressure information (e.g., wind or water pressure, pressure direction, pressure gradient), in-situ flow divergence information, and/or in-situ curl information of the fluid flow. Sensor 112 may be able to detect and/or measure pressure, temperature, fluid velocity, fluid acceleration, light (brightness), or any other measure of weather-related physical phenomena. The monitoring units 110 may be mounted on carriers distributed in a defined area in the fluid, such as buildings, wind turbines, cranes, tall trucks, automobiles, and ships capable of navigating above or under water, and any type of devices, stationary or mobile, so that the monitoring units 110 may be distributed in a defined area of the fluid, such as an open field, a city block, or a particular area under water, and measure and/or detect the above-mentioned physical information of the fluid.

Communicator 114 may be able to communicate with any number of communication networks, such as a cellular network, a local area network, or a wide area network. Communicator 114 may communicate according to any number of communication protocols, standards, networks, or topologies. As examples, communicator 114 may communicate across cellular networks or standards (e.g., 2G, 3G, Universal Mobile Telecommunications System (UMTS), GSM® Association, Long Term Evolution (LTE)™, or more), WiMAX, Bluetooth, WiFi (including 802.11 a/b/g/n/ac or others), WiGig, Global Positioning System (GPS) networks, and others available at the time of the filing of this application or that may be developed in the future. Communicator 114 may include processing circuitry, data ports, transmitters, receivers, transceivers, or any combination thereof to communicate across any of the above-listed protocols, standards, networks, or topologies.

Data processing unit 120 communicates with monitoring units 110 via communicators 114 installed in the monitoring units 110 and communicator 124 installed in the data processing unit 120. Communicator 124 may be implemented as described above with respect to communicators 114. Data processing unit 120 may perform a variety of data processing functions on data collected from monitoring units 110. For example, data processing unit 120 may analyze data to remove any erroneous or abnormal data that is inconsistent with other data. Such a determination to remove data may be based on a statistical analysis of the data collected. Data processing unit 120 may be configured analyze a flow field as it changes over time to predict future flow fields. Data processing unit 120 may be configured to generate a prediction of weather at certain geographical locations.

Data processing unit 120 is intended to cover a wide range of potential variations. For example, data processing unit 120 may include a computing device capable of sending or receiving signals, such as via a wired or a wireless network. Data processing unit 120 may also include a desktop computer or a portable device, such as a cellular telephone or a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or a specially designed device for processing the physical information of fluid measured by the monitoring units 110.

Information collected, calculated, or determined by data processing unit 120 may be communicated to data receiving unit 130. Data receiving unit 130 may include a communicator 134 capable of communicating with the data processing unit 120. Communicator 134 may be implemented as described above with respect to communicators 114. On behalf of data receiving unit 130, communicator 134 may be able to send and/or receive requests and/or data from the data processing unit 120. Data receiving unit 130 may be located at a target position in the defined area. Data receiving unit 130 may include a display device, audio device or other device to alert a person of predicted inclement weather or dangerous weather conditions, such as imminent wind gusts, lightning strikes, or tornadoes.

Data receiving unit 130 may also be capable of sending instructions to take preventive action to avoid weather-related equipment damage or personal injury. Such instructions may include, for example, changing the configuration of machinery, halting the operating of machinery, taking shelter, or leaving the area altogether. Instructions may take the form of electronic messages that may be executed automatically. For example, data receiving unit 130 may send an instruction to a crane to lower its boom to avoid sustaining damage in an on-coming windstorm. The crane may automatically lower its boom. In another example, data receiving unit 130 may instruct vehicles to automatically return to a garage using drive-by-wire methods.

Data receiving unit 130 may be configured according to any number of user requirements with respect to communication capabilities, data transfer configurations, data collection configurations, and other configurations. Data receiving unit 130 may be located or installed on a vehicle, heavy machinery, or equipment, and may also collect any data the vehicle, heavy machinery, or equipment.

Data receiving unit 130 may be combined with data processing unit 120. In this embodiment, the data processing may be performed by a software application or hardware implementation on the combined data receiving unit and data processing unit. In the alternative where a software application is used, the software may be downloaded over a network for installation on the data processing/receiving unit.

Further, flow field monitoring system 100 may incorporate several units each comprising any combination of monitoring unit 110, data processing unit 120, and data receiving unit 130, and a communicator as described above with respect to communicator 114. In other words, a single device may incorporate monitoring unit 110, data processing unit 120, data receiving unit 130, and communicator 114. Incorporating such combinations in a system may be advantageous because this arrangement may result in a more robust system in which a failure of one data processing unit 120 does not cause a total system breakdown. Other data processing units 120 may be able to continue processing data and performing the functions described above to predict weather. Because each combined unit may include a communicator, the system may be able to rely on several combined units to collect and analyze data, and share the data and analyses with other combined units.

Figure 2:
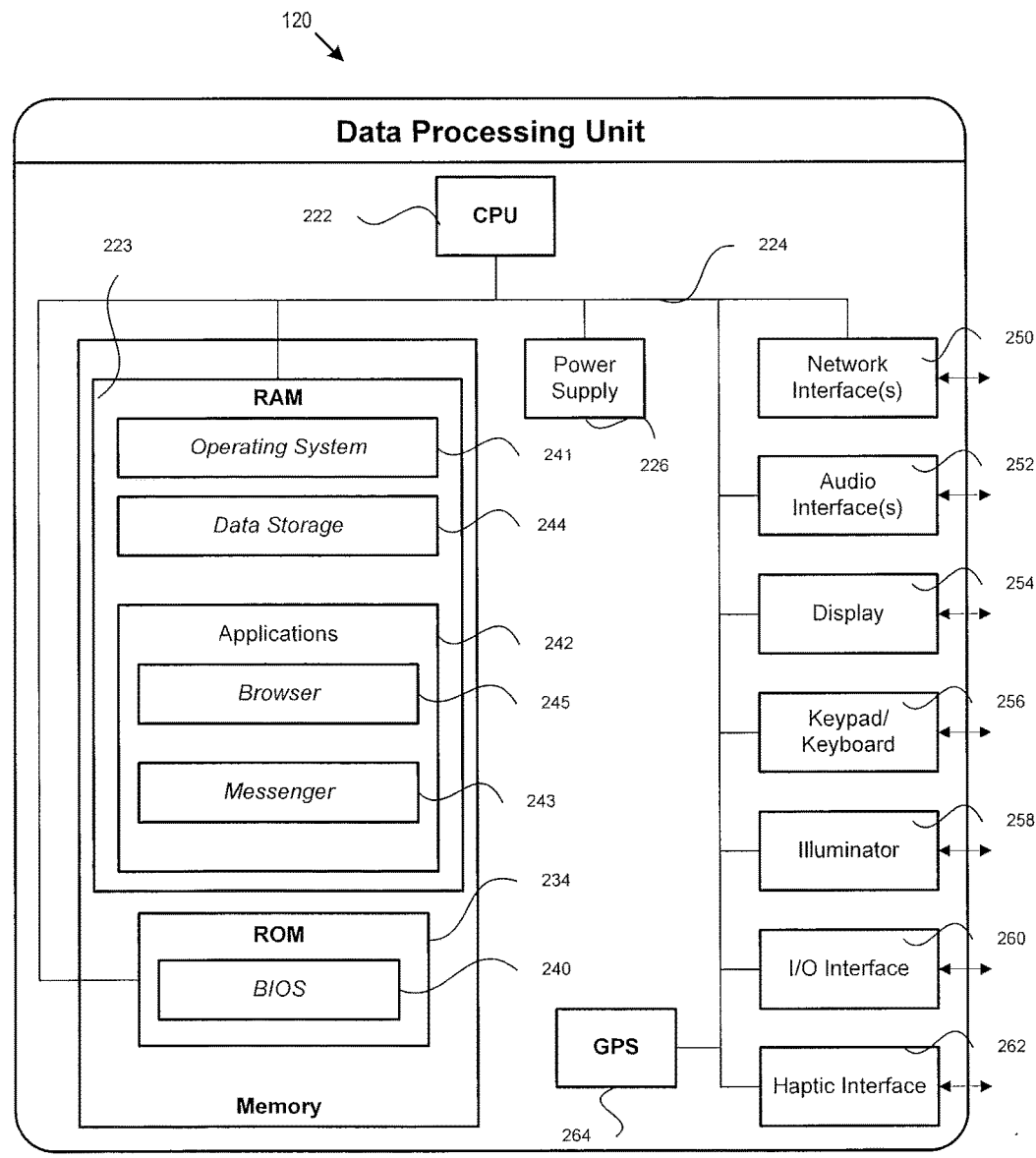
FIG. 2 is a schematic diagram illustrating a processing unit according to one embodiment of the invention.

FIG. 2 is a schematic diagram illustrating an exemplary embodiment of processing unit 120. Data processing 120 unit may include a keypad/keyboard 256 or a display 254, such as a monochrome liquid crystal display (LCD) for displaying text. Alternatively, a web-enabled data processing unit 120 may include one or more physical or virtual keyboards, mass storage, one or more accelerometers, one or more gyroscopes, global positioning system (GPS) 264 or other location-identifying type capability, or a display with a high degree of functionality, such as a touch-sensitive color 2D or 3D display, for example.

The data processing unit 120 may include or may execute a variety of operating systems 241, including a personal computer operating system, such as a Windows, iOS or Linux, or a mobile operating system, such as iOS, Android, or Windows Mobile, or the like. The data processing unit 120 may include or may execute a variety of possible applications 242, such as a browser 245 and/or a messenger 243.

Data processing unit 120 may enable communication (e.g., sending and receiving instructions and data) with other devices, such as the monitoring units 110, the data receiving units 130, and/or other data processing units via wired or wireless communications. Such wired or wireless communications may be voice communications, analog or digital data communications, or any other type of communications.

Figure 3:
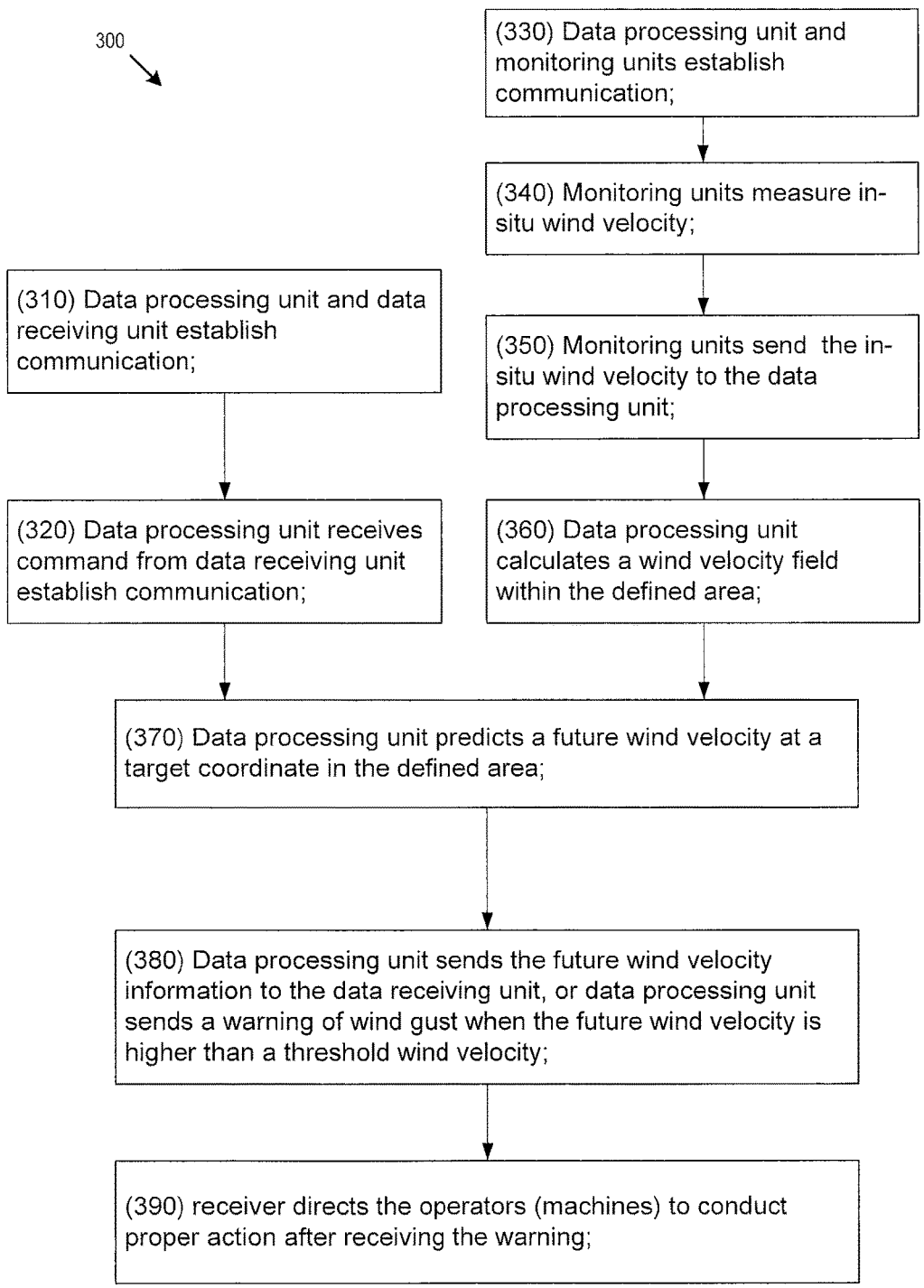
FIG. 3 is a block diagram of a process for flow field prediction according to one embodiment of the invention.

FIG. 3 is a block diagram of a process for flow field prediction according to one embodiment of the invention. After the data processing unit has established communications with the monitoring units, as shown in step 330, the monitoring units may measure the physical information of the fluid in step 340, and send the physical information to the data processing unit in step 350. In step 360, the data processing unit may then process the physical information and calculate a flow field of the fluid based on the physical information as measured in the area that the monitoring units are located. The flow field may be a flow field of the physical information, such as a field of the flow velocity (e.g., wind or water speed and direction), flow pressure (e.g., wind or water pressure), pressure direction, pressure gradient, flow divergence, and/or flow curl of the fluid.

The flow field may be a collection of the physical information from the monitoring units. The flow field may also be a mathematical model describing the flow field based on the physical information from the monitoring units. In addition, the data processing unit may also detect and/or analyze effect of territorial features in the defined area to the flow field associated with the fluid by comparing the physical information received from different monitoring units.

Prior to or after the calculation of the flow field, the data processing unit may establish a communication with the data receiving unit in step 310. The establishment of the communication may be initiated by the data processing unit or the data receiving unit.

The data receiving unit may send a command to the data processing unit 120 in step 320, requesting the data processing unit to predict future physical information at the target coordinates where the data receiving unit is located. The data receiving unit may request that the data processing unit send a message associated with the predicted future physical information to the data receiving unit at regular intervals, or upon occurrence of a trigger condition and/or signal. For example, the data receiving unit may request information from the data processing unit about weather prediction every five minutes. Or, the data receiving unit may request information from the data processing unit when the receiving unit detects worsening weather conditions by comparing weather predictions previously received from the data processing unit.

Communication between the data processing unit and the data receiving unit may be initiated by the data processing unit. The data processing unit may send a signal to the data receiving unit that includes a prediction of future physical information, for example, a weather forecast or prediction. The data processing unit may send weather forecasts or other predicted physical information about the flow field at regular intervals, or upon occurrence of a trigger condition and/or signal. For example, the trigger condition and/or signal may be any of a predefined change in predicted future physical information at the target coordinates as compared to current physical information at the target coordinates according to the flow field. The trigger condition and/or signal may also be a warning condition and/or signal indicative of the predicted future physical information at the target coordinate. For example, if the weather prediction indicates wind speeds greater than a threshold value (e.g., 30 mph), then the data processing unit may send a message to the data receiving unit. This message may comprise a warning or instructions on how to prepare for the predicted weather or other physical change in the environment at the target coordinates.

Upon receipt of a command from the data receiving unit requesting a prediction, the data processing unit may proceed to step 370 to predict future physical information of the flow field of the fluid either at the target coordinates alone or of the entire defined area. Alternatively, as discussed above, data processing unit may execute step 370 without receiving a command from the data receiving unit. For example, a data processing unit may be programmed to continuously or sporadically predict future physical information of the flow field for weather prediction. During a routine execution of step 370, if the flow field prediction indicates that the weather conditions will soon deteriorate at the target coordinates where the data receiving unit may be located, then the data processing unit may proceed to step 380. In step 380, the data processing unit may send the message according to the command of the data receiving unit. In step 390, the receiver then may further direct the operators (machines) to conduct proper action after receiving the warning.

Figure 4:
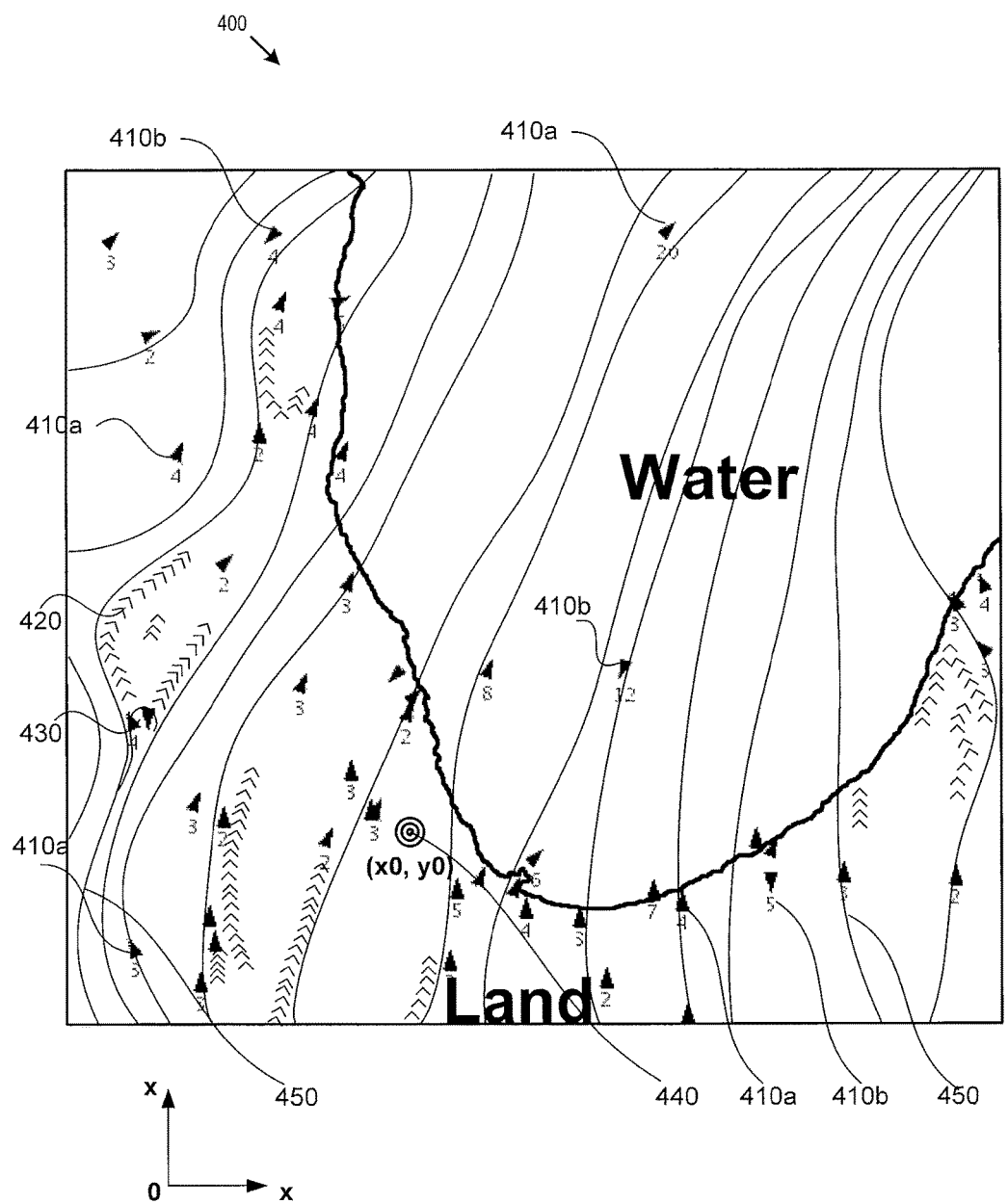
FIG. 4 is a schematic diagram illustrating an early weather alert application according to one embodiment of the invention.

FIG. 4 is a map of an open field illustrating an early weather alert application of the system according to one embodiment of the invention. Arrows 410 represent information, measurements, and other data collected by monitoring units. For example, each arrow 410 may represent one monitoring unit. The direction of arrows 410 may represent the direction of flow, for example, the wind direction or current direction. The number associated with each arrow 410 may represent the magnitude of physical parameter represented by arrow 410. For example, the number may represented the magnitude of wind velocity, which is otherwise known as wind speed, current speed. The arrow may also represent, for example, pressure, in which case the direction of arrow 410 may be indicative of the current trend in pressure (increasing or decreasing) based on a predetermined number of previous measurements. The number associated with arrow 410 in this case may represent air pressure.

Arrows 410a represent data that may be deemed "OK," or consistent with neighboring data by the data processing unit or data receiving unit. For example, if arrow 410a represents data collected by a monitoring unit within one hundred yards of a neighboring monitoring unit, which has measured similar data, then the data for arrow 410a may be deemed OK and consistent. Arrows 410a deemed OK may be included in a calculation of field flow by a data processing unit.

Arrows 410*b*, however, represent data that may be deemed "NOK," or inconsistent with neighboring data by the data processing unit or data receiving unit. For example, if arrow 410*b* represents data collected by a monitoring unit within one hundred yards of a neighboring monitoring unit, which has measured entirely inconsistent data (e.g., opposite wind direction or average wind speed differing by a factor of two), then the data for arrow 410*b* may be deemed NOK and inconsistent. Arrows 410*b* deemed NOK may be excluded in a calculation of field flow by a data processing unit. Arrows 410*b* indicating NOK data may indicate a damaged or malfunctioning monitoring unit.

Formations 420 represent territorial features such as hills, mountains, basins, valleys, buildings, cities, or any other geological or human-made formations. Map 400 may include such data to be used by a data processing unit to predict future physical information. For example, if map 400 includes this data, then a data processing unit may be able to more accurately predict how changing wind velocity at one corner of a defined area may ultimately affect wind velocity at another corner of a defined area. Using current physical information determined by collecting measurements from monitoring units, a data processing unit may determine how the formations 420 impact fluid flow or other weather phenomena. For example, at point 430 of map 400, a basin formation has caused the flow direction to shift as indicated by the nearly opposing arrows at point 430. The flow is thus altered by the formations and the flow may form a vortex or other weather phenomena. The flow, in this example, may be wind.

Point 440 represents target coordinates having "x-y" coordinates of (x0, y0). Point 440 may also represent a geographical location in latitude and longitude. Point 440 may represent the location of a data receiving unit. Point 440 may also represent the location of persons, including construction workers, school children, hospital employees, first responders, or any other persons. Further, point 440 may represent the location of machinery or equipment, such as trucks, cranes, or a collection of construction equipment at a construction site. Map 400 may track many such target coordinates and may include addressing information for data receiving units at these points. A data processing unit may store map 400 in a database, or may retrieve map 400 in a networked and/or centralized database that may be accessible by one or more data processing units or receiving units.

Lines 450 may represent the flow field of the fluid, for example, the flow field of wind. A database associated with map 400 may store flow field information, for example, wind velocity, at regular spacing intervals, or along a grid, on map 400. This information may be based on, or estimated using, data collected by monitoring units. Alternatively, the flow field may be limited to data at irregular locations, or a non-grid, on map 400. Lines 450 may represent graphically the flow field information comprising the flow field of a flow fluid. If target coordinates, for example, point 440, lie in between two lines 450, or between two points on the grid or non-grid of map 400, then data processing unit may calculate an estimate of the flow field value at the target coordinates. The estimate may be based on historical information regarding flow fields (based on historic measurements) and may also be based on the formations near the target coordinates that may impact the flow field, and more generally, the weather near the target coordinates.

When a data processing unit attempts to predict future information about the flow field, for example, to generate a weather prediction for a target position, the data processing unit may access map 400 and the database associated with map 400 to prepare the prediction. A predicted flow field may be created and overlaid onto map 400. The prediction in graphical form on map 400 may be sent to data receiving units.

Based on the data processing unit's analysis of the predicted flow field, which may be represented by lines 450, the data processing unit may make a determination the dangerous weather will likely occur at a target position, for example, point 440, in the future. The data processing unit may look-up the address of a data receiving unit at point 440, such as an internet protocol address, a cellular telephone number, or similar electronic address, and send a warning to the data receiving unit at point 440. In this way, persons or equipment at or near point 440 may be alerted. The alert may be audible, such as a siren, or visual, such as a flashing light. The data processing unit may also transmit instructions to the data receiving unit that may be executed upon receipt. For example, the instructions may cause equipment, buildings, vehicles, and other devices or human-made formations to change configuration in order to protect same from potentially hazardous and damaging weather. For example, cranes may automatically lower their booms, buildings may automatically close shutters or doors, and vehicles may automatically drive into garages using drive-by-wire. Other possibilities for protecting equipment and persons are possible. The advantage gained by the present embodiment is that an accurate weather prediction based on a predefined area is provided early enough to protect persons and equipment, which may be automatically protected—no human intervention may be required.

Figure 5:
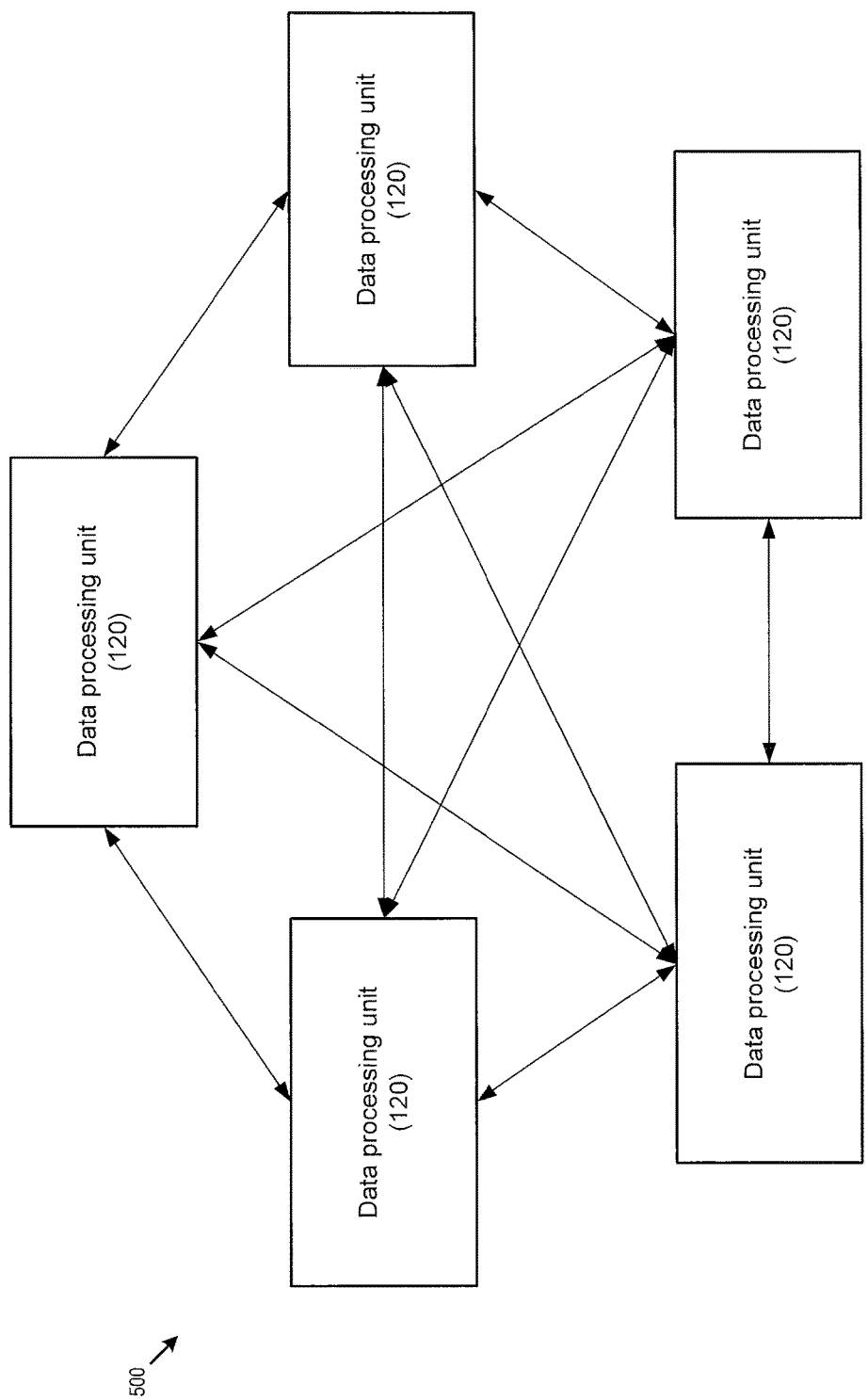
FIG. 5 is a block diagram of a system of data processing units according to another embodiment of the invention.

FIG. 5 is a block diagram of a system of data processing units according to another embodiment of the invention. Data processing units 120 may each be in communication with one another. Each data processing unit 120 may be configured to collect measurements from the same or different monitoring units in a predefined area. This configuration may be advantageous because multiple data processing units may be able to combine their results to generate more accurate weather predictions or contingent weather predictions in the event a data processing unit fails. Alternatively, each data processing unit 120 may be located in its predefined area. It may be advantageous for neighboring and distance data processing units to share information to improve weather prediction at boundaries of the predefined areas. It may also be advantageous to share information in this manner because it may allow even earlier weather predictions, and thus, may allow for greater lead time before dangerous weather occurs at a target position.

Figure 6:
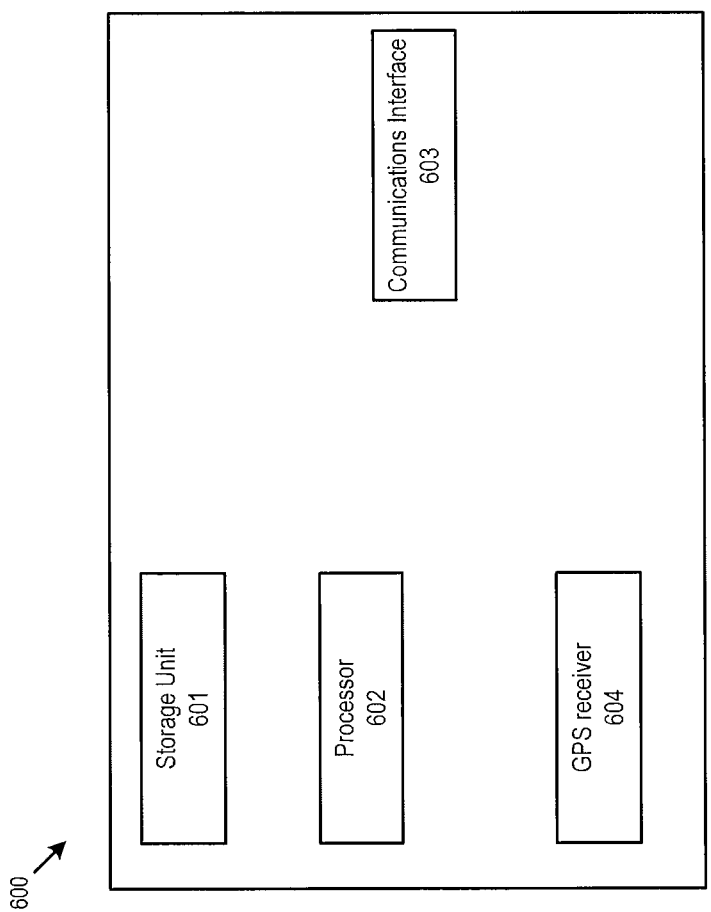
FIG. 6 illustrates a block diagram of a data receiving unit, according to some embodiments of the present invention.

FIG. 6 illustrates a block diagram for a data receiving unit 600 according to one embodiment of the invention. The data receiving unit 600 may include a storage unit 601, processor 602, communications interface 603, and a GPS receiver 604. Data receiving unit 600 may be configured according to any number of user requirements with respect to communication capabilities, data transfer configurations, data collection configurations, and other configurations. Data receiving unit 600 may also collect any vehicle data, such as performance statistics, route information, position data, traffic data, and others. In one example, data receiving unit 600 may include telemetry functionality to collect and/or send vehicle data. These telemetry functions may include measurements or records of speed, direction, acceleration, pitch, yawl, and roll, and measurements or records of rate of change for speed, direction, acceleration, pitch, yawl, and roll. Applications may be installed on data receiving unit 600 to facilitate, support, or perform any of the methods or steps to the methods described herein. For example, applications may be installed to process information, e.g., weather predictions or weather data. One example of data receiving unit 600 is the Openmatics© on-board unit provided by ZF Friedrichshafen AG.

Methods or processes may be implemented, for example, using a processor and/or instructions or programs stored in a memory. Specific components of the disclosed embodiments may include additional or different components. A processor or processing unit may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method performed by a data processing unit to predict weather conditions in a defined area and to cause an automatic change in a device located at a target coordinate within the defined area to prevent damage to the device based on the predicted weather conditions, the method comprising:
    measuring, via a plurality of monitoring units, physical information associated with a fluid in the defined area; wherein each of the plurality of monitoring units comprises a communicator and a sensor and is positioned on carriers located within the defined area; wherein the sensors of the plurality of monitoring units measure the physical information associated with the fluid in the defined area;
    sending the physical information associated with the fluid via the communicators of the plurality of monitoring units to the data processing unit that is remote from the defined area;
    receiving, via a communicator of the data processing unit, the physical information associated with the fluid from the plurality of monitoring units; wherein the data processing unit also comprises a computer operating system;
    calculating, via the computer operating system of the data processing unit, a flow field associated with the fluid within the defined area based on the physical information associated with the fluid that the data processing unit receives from the plurality of monitoring units;
    predicting future physical information associated with the fluid at the target coordinate in the defined area based on the flow field, via the computer operating system of the data processing unit;
    sending a message associated with the predicted future physical information, via the communicator of the data processing unit, to a receiver in the defined area upon occurrence of a trigger condition associated with the predicted future physical information; wherein the receiver comprises a communicator and a processor;
    sending instructions via the communicator of the receiver to the device at the target coordinate based on the message from the communicator of the data processing unit; and
    automatically changing the device based on the instructions from the receiver to avoid sustaining damage from the predicted weather conditions, the automatic change including one or more of the following: an automatic change in a physical configuration of the device or an automatic change in a physical location of the device to a new location outside the target coordinate, the automatic change in the physical configuration of the device includes changing a location of at least a portion of the device.

2. The computer-implemented method according to claim 1, wherein the trigger condition comprises:
    a warning signal indicative of the predicted future physical information at the target coordinate is greater than a threshold value; and/or
    an update signal indicative of a request to receive the predicted future physical information at the target coordinate; and
    wherein the message comprises:
    a warning message indicative of the predicted future physical information at the target coordinate is greater than a threshold value; and/or
    the predicted future physical information at the target coordinate.

3. The computer-implemented method according to claim 1, wherein the physical information associated with the fluid is at least one of flow speed, flow direction, change of flow direction, flow pressure, flow pressure direction, flow pressure gradient, divergence, and curl of the fluid flow.

4. The computer-implemented method according to claim 1, wherein the flow field associated with the fluid describes at least one of path and velocity of the fluid that flows through the defined area.

5. The computer-implemented method according to claim 1, wherein each of the plurality of monitoring units collects the physical information associated with the fluid that flows through the defined area.

6. The computer-implemented method according to claim 1, wherein the fluid is air and each of the plurality of monitoring units is at least one of a weather monitoring station, a weather monitoring vehicle, and a weather monitoring crane.

7. The computer-implemented method according to claim 1, further comprising detecting an effect of territorial features in the defined area on the flow field associated with the fluid by comparing the physical information received from different monitoring units of the plurality of monitoring units.

8. The computer-implemented method according to claim 1, wherein the change in the device comprises changing an orientation of a component of the device, turning the device on or off, and/or causing the device to move.

9. The computer-implemented method according to claim 1, wherein calculating the flow field comprises excising the physical information associated with the fluid that is received from an abnormal monitoring unit of the plurality of monitoring units wherein data received from the abnormal monitoring unit is inconsistent with data from a remaining group of monitoring units.

10. An early alert system for predicting weather conditions in a defined area and for causing an automatic change in a device located at a target coordinate within the defined area to prevent damage to the device based on the predicted weather conditions, the system comprising:
- a plurality of monitoring units for measuring physical information associated with a fluid in the defined area and for sending the physical information associated with the fluid to a data processing unit;
- wherein each of the plurality of monitoring units comprises a communicator and a sensor;
- wherein the sensors of the plurality of monitoring units measure the physical information associated with the fluid in the defined area and the communicators of the plurality of monitoring units send the physical information associated with the fluid to the data processing unit;
- wherein the plurality of monitoring units are positioned on carriers located within the defined area; and
- wherein the data processing unit comprises a communicator and a computer operating system and is configured to:
  - receive physical information via the communicator of the data processing unit associated with the fluid from the communicators of the plurality of monitoring units;
  - calculate a flow field associated with the fluid within the defined area based on the physical information associated with the fluid via the computer operating system of the data processing unit that is received from the communicators of the plurality of monitoring units;
  - predict future physical information associated with the fluid at the target coordinate in the defined area based on the flow field via the computer operating system of the data processing unit; and
  - send a message associated with the predicted future physical information via the communicator of the data processing unit to a receiver in the defined area upon receipt of a trigger signal associated with the predicted future physical information; wherein the receiver comprises a communicator and a processor;
  - send instructions via the communicator of the receiver to the device at the target coordinate based on the message from the communicator of the data processing unit; and
  - cause an automatic change in the device based on the instructions from the receiver to avoid sustaining damage from the predicted weather conditions, the automatic change including one or more of the following: an automatic change in a physical configuration of the device or an automatic change in a physical location of the device to a new location outside the target coordinate, the automatic change in the physical configuration of the device includes changing a location of at least a portion of the device.

11. The early alert system according to claim 10, wherein the trigger signal comprises:
- a warning signal indicative of the predicted future physical information at the target coordinate is greater than a threshold value; and/or
- an update signal indicative of a request to receive the predicted future physical information at the target coordinate; and
- wherein the message comprises:
- a warning message indicative of the predicted future physical information at the target coordinate is greater than a threshold value; and/or
- the predicted future physical information at the target coordinate.

12. The early alert system according to claim 10, wherein the physical information associated with the fluid is at least one of flow speed, flow direction, change of flow direction, flow pressure, flow pressure direction, and flow pressure gradient.

13. The early alert system according to claim 10, wherein the flow field associated with the fluid describes at least one of path, velocity, pressure, pressure direction, and pressure gradient of the fluid that flows through the defined area.

14. The early alert system according to claim 10, wherein the change in the device comprises changing an orientation of a component of the device, turning the device on or off, and/or causing the device to move.

15. The early alert system according to claim 10, wherein the processor is further configured to excise the physical information associated with the fluid that is received from an abnormal monitoring unit of the plurality of monitoring units wherein data received from the abnormal monitoring unit is inconsistent with data from a remaining group of monitoring units.

16. The early alert system according to claim 10, wherein the data processing unit is further configured to detect an effect of territorial features in the defined area to the flow field associated with the fluid by comparing the physical information received from the plurality of monitoring units.

17. A computer-implemented method for predicting weather conditions in a defined area and for causing an automatic change in a device located at a target coordinate within the defined area to prevent damage to the device based on the predicted weather conditions, the method comprising:
- receiving, via a communicator of a data processing unit, a message associated with predicted physical information; wherein the data processing unit also comprises a computer operating system;
- generating, via the computer operating system of the data processing unit, a warning signal when the prediction is above a threshold value;
- sending instructions via the communicator of the data processing unit to the device at the target coordinate based on the warning signal; and
- automatically changing the device based on the instructions to avoid sustaining damage when the prediction is above the threshold value, the automatic change including one or more of the following: an automatic change in a physical configuration of the device or an automatic change in a physical location of the device to a new location outside the target coordinate, the automatic change in the physical configuration of the device includes changing a location of at least a portion of the device;
- wherein the prediction is based on a flow field associated with the fluid; and
- wherein the flow field is calculated based on physical information received from a plurality of monitoring units that are distributed in the defined area.

18. The computer-implemented method according to claim 17, further comprising generating a message that directs a receiver operatively coupled to the data processing unit to take action to avoid sustaining damage to an equipment.

19. The computer-implemented method according to claim 18, wherein the equipment is a crane, and the physical configuration of the crane is changed such that a boom of the crane is lowered.

* * * * *